Sept. 9, 1930.   C. P. HARRISON   1,775,592
POWER OPERATED CHUCK
Filed March 10, 1927   2 Sheets-Sheet 2
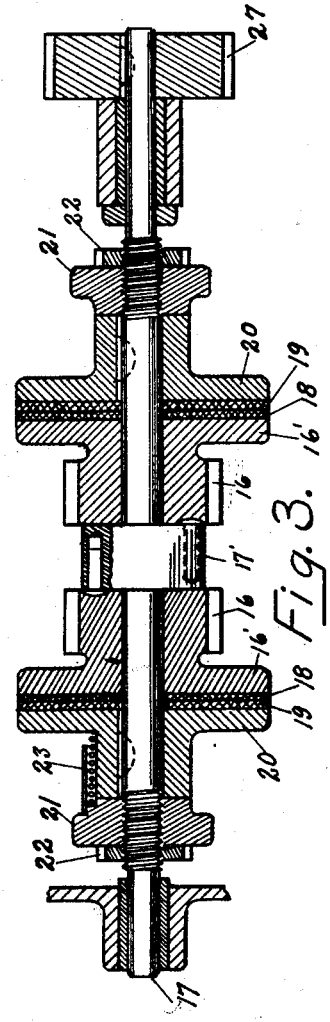
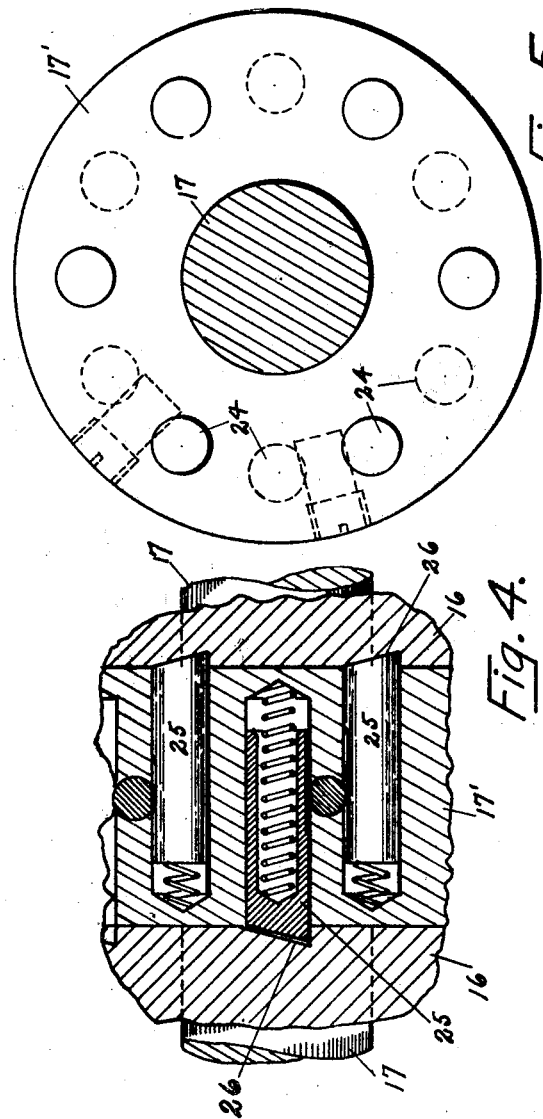
WITNESSES:
WALTER J. BLASS
C. Richard Nece
INVENTOR.
CHARLES P. HARRISON.
BY
ATTORNEY.

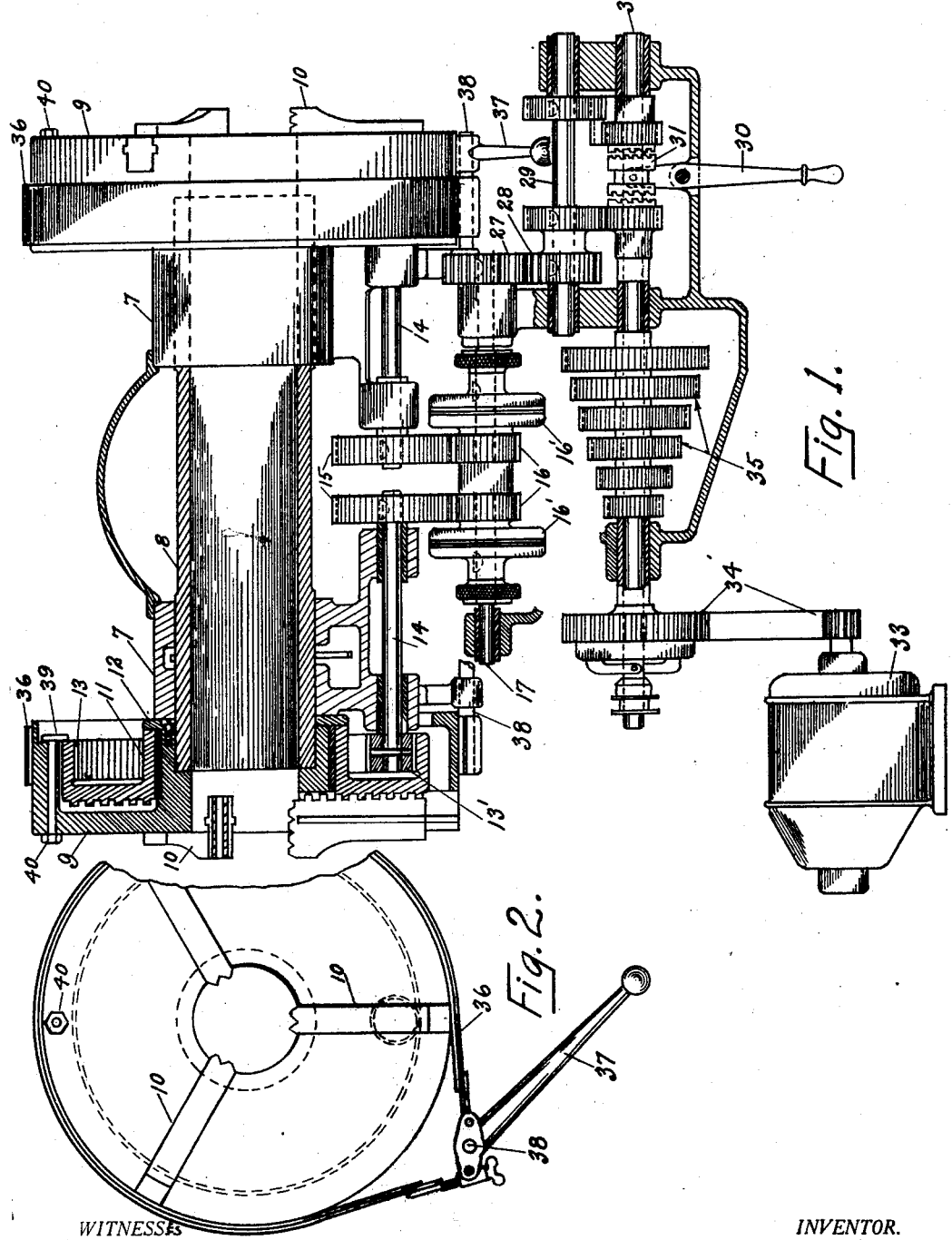

Patented Sept. 9, 1930

1,775,592

UNITED STATES PATENT OFFICE

CHARLES P. HARRISON, OF WESLEYVILLE, PENNSYLVANIA

POWER-OPERATED CHUCK

Application filed March 10, 1927. Serial No. 174,229.

My invention relates to a power operated chuck for any metal working machine or the like but particular reference is made to the application of the same for a pipe threading machine where two chucks are employed. An object of this invention is to provide means whereby the driving power is applied directly to the chuck scrolls and is used both for revolving the chucks and connected parts and for opening and closing the chucks themselves.

Another object of the invention is to provide means whereby a chuck or a pair of chucks can be operated to open and close by power from the same source and by the same means by which they are rotated.

A further object is to provide a pair of chucks upon which the work gripping tension may be varied upon both of the chucks or on either chuck independently of the other.

A further object is to provide a pair of chucks which will each grip the work with a predetermined pressure independently of each other and regardless of whether one chuck may become advanced ahead of the other.

A further object of this invention is to provide means whereby the closing of the chucks may be set to a predetermined gripping pressure but opened with a positive or an increasingly positive drive.

A further object of this invention is to provide means whereby if desired the gripping pressure can be varied by the operation of the brake mechanism as well as by the driving mechanism.

Pipe-threading and other metal-working machines of the type employing a chuck or two chucks to grip and drive the work are usually of such a construction that the machine must be stopped and the chuck manually operated, a heavy laborious and slow operation. Some chucks have been made that will open and close while in operation but will operate only on the diameter of work for which they are set and must be reset by hand for other diameters of work.

The chucks of this invention employ a motor or source of power for opening and closing, while it is otherwise running idle and will operate both chucks at the same time which is a great labor and time saver. They will also grip any size of work within their capacity, without attention or adjustment by the operator.

Referring to the drawings which are made a part hereof and on which similar reference characters indicate similar parts:

Figure 1 is a front elevation, principally in section, showing the construction of the chucks and the complete driving mechanism for the same, Figure 2, a front elevation of a chuck and its braking device, Figure 3, an enlarged section of a shaft and related parts shown in Fig. 1, illustrating the driving and tension regulating device, Figure 4, a fragmentary section of Fig. 3, showing the positive drive for opening, and Figure 5, an end elevation of the same viewed from the right.

In the drawings Figure 1 shows a headstock 7 of any desirable form or construction having bearings in which the spindle 8 is rotatably mounted. A chuck body 9 is mounted on and secured to each end of said spindles, the chucks on each end being alike except that they have right and left hand scrolls. Chuck jaws 10 of the usual type of construction are slidably mounted in said chuck and operated in the usual method of a scroll chuck by a scroll 11 which is rotatably mounted on the hub of the chuck body 9 and secured against lateral motion by a collar 12. Internal gear teeth 13 are formed on the scroll 11 and mesh with the driving pinions 13' mounted on shaft 14. Gears 15 secured to the inwardly extending ends of said shafts mesh with gears 16 which are rotatably mounted on a shaft 17, a flange 16' (Fig. 3) being a part of and formed on each of said gears. Each of said flanges has a facing or surface of friction material 18, secured to its face, engaging a facing of similar friction material 19 secured to the face of a friction flange 20 which is in turn secured to the shaft 17 by a key which prevents rotation on the shaft 17 but permits an axial adjustment for controlling the frictional contact of the two friction surfaces 18 and 19 and such contact or relation being adjusted by the nut 21 which is secured in adjusted position by the lock nut 22. It will be observed that duplication of parts continues down each side of the drive to this point for each chuck.

If a resilient tension is found necessary for the proper action of the friction surfaces a spring 23 may be used as shown or some other type of friction or driving device may be used without departing from the spirit and purpose of my invention.

The shaft 17 has an enlarged portion 17′ (Figs. 3–4–5) between the two gears 16 in which is drilled a series of longitudinal holes 24 alternately opening at opposite ends of said portion and having slidably inserted in each hole the spring pressed plungers 25 which are formed with inclined faces at their outwardly projecting ends for the purpose of engaging in one direction only with notches or teeth 26 formed in the faces of the gears 16.

It will be obvious to those skilled in the art, that while the shaft 17 is rotating in one direction it revolves the gears 16 through the contact of the friction surfaces 18—19 and when revolving in the other direction it has in addition to the friction drive a positive action by means of the plungers 25 engaging the gears 16 for the purpose of opening the chucks, this being for the reason that the gripping action on the pipe increases the friction between the jaws and the scroll which requires more power for opening than is required for closing.

A gear 27 secured to the shaft 17 is driven by a gear 28 (Fig. 1) which is secured to a reversible shaft 29 in the reversing mechanism shown which is a well known type of reversing gear composed of spur gears and controlled by the lever 30 which operates the double ended toothed clutch 31 slidably mounted and secured to the shaft 32. Any other type of reversing mechanism can be employed without departing from the spirit of my invention.

For the purpose of illustration but not necessarily a part of my invention, the motor 33 is denoted as a source of power acting through suitable gearing 34 on a speed changing device 35 of any desirable form for giving the correct speeds for revolving the chucks through the drive as heretofore described.

For the purpose of arresting the motion of the chuck bodies 9 for opening or closing the chucks by power, brake bands 36 (Figs. 1 and 2) around the periphery of the chucks are operated by a lever 37 secured to a shaft 38. There may be occasions where it is desired to thread left hand threads. For these few occasions the following described locking device is devised. One or more bolts 39 in the chuck body 9 lock the scroll 11 to the chuck by tightening the nut 40 so the work can be turned left hand without loosening the grip on the pipe. These are also used to lock one chuck in any desired inoperative position.

In operation supposing the chuck jaws 10 to be opened, the motor 33 running, the change-speed mechanism 35 set for the proper speed and the reversing lever 30 in the central or disengaged position, a pipe to be threaded (or other work to be operated upon) is thrust through the two chucks to the desired operating position. The lever 37 is then depressed engaging and holding the chuck bodies 9 by the friction bands 36. The lever 30 is then thrown to the right setting the gearing in motion and revolving the scrolls 11 thereby carrying the chuck jaws 10 inwardly into contact with the pipe, which arrests the inward travel of the jaws and causes the friction surfaces 18 and 19 to slip, whereupon the operator releases the pressure on the brake lever 37 and the chucks begin to revolve, being driven through said friction surfaces.

After completing the threading or other operations the lever 30 is thrown to the left reversing the direction of the drive and the brake lever 37 is depressed, engaging and holding the chuck from revolving while the scrolls unwind the jaws from contact with the pipe.

It will be obvious that the adjustment of the friction devices 18 and 19 determines the force of the grip of the chuck jaws on the pipe as it is sometimes desirable to have one chuck grip the pipe lightly for centering purposes only. However, the combined friction drive on the two chucks must be sufficient for the turning and threading operations which are to be performed on the pipe. For a lesser grip on the pipe or as another means of varying the grip it will be observed that the pressure exerted on the brake lever 37 also can be varied. For a small diameter of pipe upon which a lighter grip is desirable the brake levers 37 should be depressed very lightly and the pressure increased as the size of the pipe is increased. The depression of the levers 37 should be such that when the chuck jaws engage the pipe the chucks will slip in the brake bands and start revolving instead of slipping at the friction devices.

This will apparently be the preferable way of varying the power of the grip on the pipe as the operator will with very little practice be able to give the brakes just the necessary tension for proper driving. When unwinding the chucks it is always necessary to depress the brake lever and hold the brakes more firmly in order to loosen the grip and start the chucks to open.

Many variations may be made in the device of my invention, as shown in the drawings and described in the specification. Among those changes which I may use in practice and hereby claim as part of this invention, are such modifications as substituting a friction clutch for a toothed clutch in the reversing mechanism; substituting an anti-friction bearing in the scroll to reduce friction, instead of the plain bearing as shown; and changing the position of the shaft 38 so the brake band has a greater braking tension on the unwinding motion than during the winding up motion.

Other variations will be obvious to those skilled in the art, all without departing from the spirit of my invention; therefore I do not limit myself to the specific embodiment shown in the drawings and described in the specification, but only as indicated in the appended claims.

Having thus fully described my said invention, what I claim as new and desire to secure by Letters Patent is:

1. The combination of a chuck comprising a head, gripping jaws, a scroll for actuating the jaws and for driving the head, power-operated means driving the scroll, the scroll in turn driving the head, and braking means for engaging the head to retard its movement whereby said power-operated means may be caused to move the jaws radially.

2. The combination with a chuck having a head, gripping jaws on the head, a scroll for adjusting the jaws and for driving the head, said scroll having an internal gear thereon, a drive shaft, a pinion on said drive shaft meshing with said gear, and a brake for the head whereby the head may be held against rotation with respect to the scroll for moving the jaws.

3. In a chuck, a head, jaws on the head, a scroll for operating the jaws, a pinion engaging teeth on the scroll, driving means for the chuck acting on the pinion for operating the same frictionally to move the jaws inward or rigidly to move them outward, and braking means adapted to act on the head.

4. The combination with a chuck comprising a head, gripping jaws and a scroll for actuating the jaws, of power operated means on the scroll to drive the head for cutting a thread in one direction, braking means for the head whereby the power operated means may be caused to move the jaws radially, and means for locking the scroll to the head of the chuck whereby a thread may be cut in the opposite direction without loosening the grip on the work.

5. In a pipe-threading machine or the like, such machine including a plurality of widely-spaced chucks for centering and gripping a long piece of work, each of said chucks having a head and jaws thereon adjustable outward to admit the work or inward to engage the same, the combination of common driving means for rotating said chucks, conjointly actuated means for acting against the operation of the driving means so as to retard the rotation of the chuck heads, and connections from the head of each of said chucks to its jaws whereby the jaws are adjusted through the action of the driving means when the head is so retarded, substantially as set forth.

6. In a pipe-threading machine or the like, such machine including a plurality of widely-spaced chucks for centering and gripping a long piece of work, each of said chucks having a head and jaws thereon adjustable outward to admit the work or inward to engage the same, the combination of common driving means for rotating said chucks, conjointly actuated means for acting against the operation of the driving means so as to retard the rotation of the chuck heads, connections from the head of each of said chucks to its jaws whereby the jaws are adjusted through the action of the driving means when the head is so retarded, and means whereby the work-gripping tension of one chuck may be varied independently of the tension at another head, substantially as set forth.

7. In a pipe-threading machine or the like, such machine including a plurality of widely-spaced chucks for centering and gripping a long piece of work, each of said chucks having a head and jaws thereon adjustable outward to admit the work or inward to engage the same, the combination of common driving means for rotating said chucks, a brake for each chuck head, common operating means for said brakes, connections from the head of each of said chucks to its jaws for adjusting the jaws by the action of the chuck driving means when the rotation of the chuck head is retarded by said brake, and independent adjusting means for the brakes whereby the work gripping action may be varied independently at each of said chucks, substantially as set forth.

8. In a pipe-threading machine or the like, such machine including a plurality of widely-spaced chucks for centering and gripping a long piece of work, each of said chucks having a head and jaws thereon adjustable outward to admit the work or inward to engage the same, the combination of common driving means for rotating said chucks in either direction, means for retarding the rotation of the heads of said chucks, connections from said heads to their jaws whereby retardation of the rotation of a chuck head serves to adjust the corresponding jaws, and mechanism in connection with the driving means for each chuck for acting frictionally on the jaw-adjusting mechanism in closing the jaws or rigidly in opening them, substantially as set forth.

In testimony whereof I affix my signature.

CHARLES P. HARRISON.